United States Patent
Kamboh et al.

(10) Patent No.: US 9,075,753 B1
(45) Date of Patent: Jul. 7, 2015

(54) METHOD AND APPARATUS FOR MANAGING INTERFACES ON A NETWORK ELEMENT

(75) Inventors: Ameel Kamboh, Billerica, MA (US); Bernard St-Denis, Ottawa (CA)

(73) Assignee: RPX Clearinghouse LLC, San Francisco, CA (US)

( * ) Notice: Subject to any disclaimer, the term of this patent is extended or adjusted under 35 U.S.C. 154(b) by 2330 days.

(21) Appl. No.: 10/922,709

(22) Filed: Aug. 20, 2004

Related U.S. Application Data

(60) Provisional application No. 60/509,595, filed on Oct. 8, 2003, provisional application No. 60/515,113, filed on Oct. 27, 2003, provisional application No. 60/569,421, filed on May 7, 2004.

(51) Int. Cl.
  *G06F 15/173* (2006.01)
  *G06F 11/14* (2006.01)
(52) U.S. Cl.
  CPC .................. *G06F 11/1438* (2013.01)
(58) Field of Classification Search
  USPC ........... 709/233, 223; 298/17; 705/14
  See application file for complete search history.

(56) References Cited

U.S. PATENT DOCUMENTS

| | | | | |
|---|---|---|---|---|
| 6,519,458 | B2 * | 2/2003 | Oh et al. | 455/445 |
| 7,370,004 | B1 * | 5/2008 | Patel et al. | 705/14 |
| 2009/0016713 | A1 * | 1/2009 | Liu et al. | 398/17 |

* cited by examiner

*Primary Examiner* — Tammy Nguyen
(74) *Attorney, Agent, or Firm* — Christopher & Weisberg, P.A.

(57) ABSTRACT

Interfaces may be created for applications on a network element without requiring the applications to include code specific for that type of interface. An Interface Management System (IMS) may be included to provide a media abstraction layer between applications and physical media to enable interfaces to be bound to applications without modifying the application to accommodate the interface and without modifying the interface to accommodate the application. The IMS also provides an environment to support distributed interface creation to enable interfaces to be created in a distributed fashion to avoid congestion in the IMS and to facilitate sparing of the IMS and interfaces. The interfaces communicate with applications and with each other through an IFID manager to streamline communications, and to enable the IMS to keep track of the interfaces that have been created on the network element.

19 Claims, 5 Drawing Sheets

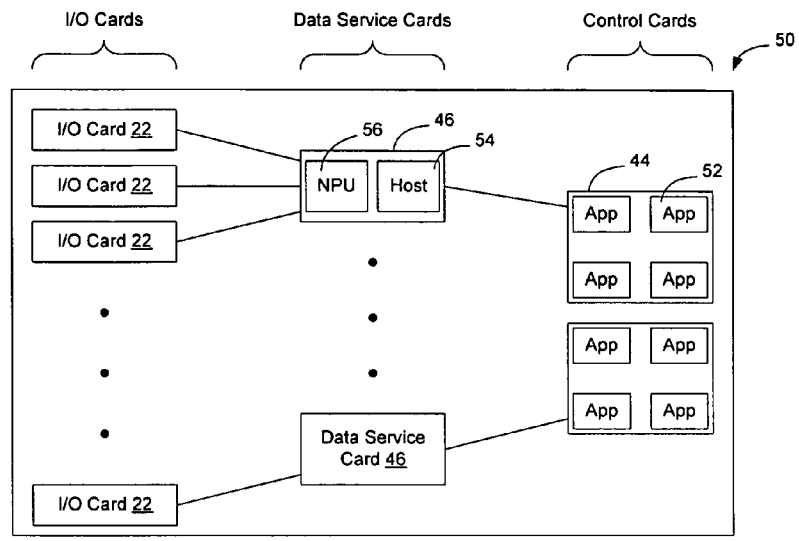
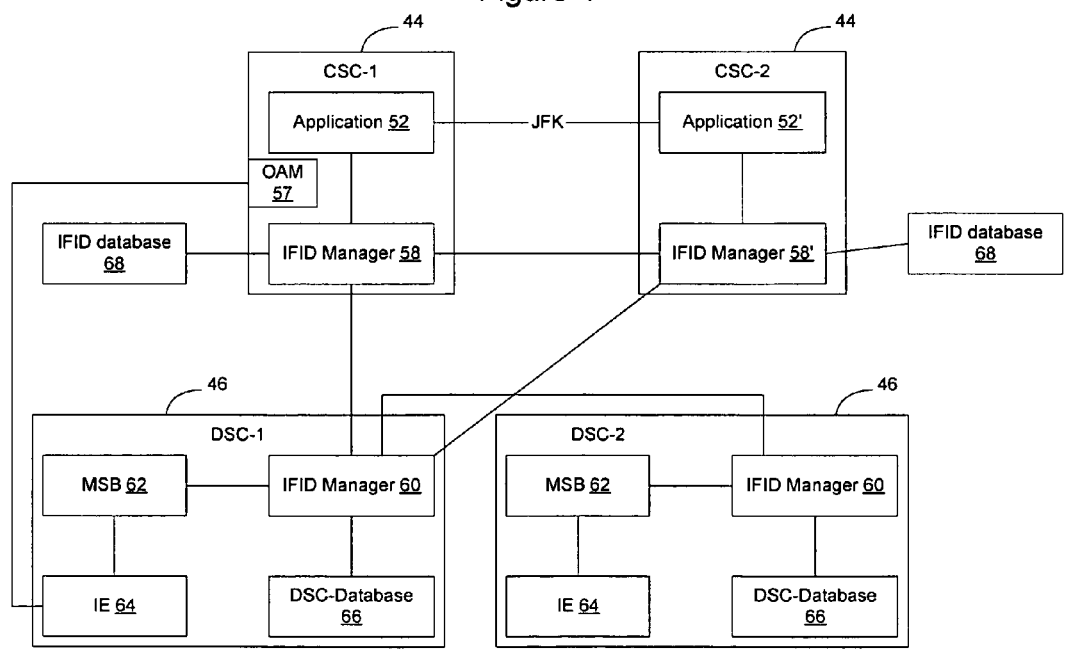

METHOD AND APPARATUS FOR MANAGING INTERFACES ON A NETWORK ELEMENT

CROSS REFERENCE TO RELATED APPLICATIONS

This application claims priority to prior Provisional U.S. Patent Application No. 60/509,595, filed Oct. 8, 2003, prior Provisional U.S. Patent Application No. 60/515,113, filed Oct. 27, 2003, and prior Provisional U.S. Patent Application No. 60/569,421, filed May 7, 2004, the content of each of which is hereby incorporated herein by reference.

BACKGROUND OF THE INVENTION

1. Field of the Invention

The present invention relates to network elements and, more particularly, to a method and apparatus for managing interfaces on a network element.

2. Description of the Related Art

Data communication networks may include various computers, servers, nodes, routers, switches, hubs, proxies, and other network devices coupled to and configured to pass data to one another. These devices will be referred to herein as "network elements." Data is communicated through the data communication network by passing data packets (or data cells, frames, or segments) between the network elements by utilizing one or more communication links between the devices. A particular packet may be handled by multiple network elements and cross multiple communication links as it travels between its source and its destination over the network.

FIG. 1 illustrates one example of a communication network 10. As illustrated in FIG. 1, subscribers 12 access the network by interfacing with Provider Edge (PE) network element 14. The provider edge network element collects traffic from the subscribers and multiplexes the traffic onto the network backbone, which includes multiple Provider (P) network elements 16 connected together. Through an appropriate use of protocols and exchanges, data may be exchanged with another subscriber or resources may be accessed and passed to the subscriber 12.

The various network elements on the communication network communicate with each other using predefined sets of rules, referred to herein as protocols. Multiple protocols exist, and are used to define aspects of how the communication network should behave, such as how the computers should identify each other on the network, the format that the data should take in transit, and how the information should be reconstructed once it reaches its final destination. Examples of several protocols include Asynchronous Transfer Mode (ATM), Frame Relay (FR), Ethernet, Transport Control Protocol (TCP), Internet Protocol (IP), Point-to-Point Protocol (PPP), and Multi-Protocol Label Switching (MPLS), although there are probably more than 100 other protocols as well that may be used to govern aspects of communications taking place over links on the network. Depending on the type of services to be provided to the customer, different protocols may be required to be used by the provider to carry the subscriber's traffic on the network 10.

Network elements may include many ports, each of which may be connected to one or more physical links operating using one or more protocols. For example, the provider edge network element 14 may connect with the subscribers over different physical links connected to different physical ports. Interfaces on a network element represent a mapping between an application and one or more of the ports. For example, a given application may need an interface to carry Ethernet traffic across an IP-based Virtual Private Network tunnel. The interface may require access to one or more of the network element's physical ports. By configuring an interface on the network element, the network element's physical resources may be abstracted so that applications and services can use the interfaces to obtain access to the network element's physical resources.

Interface management relates to how interfaces are created, used, managed, and destroyed on a network element. Conventionally, interfaces were created at a central interface controller and, once the interfaces were created, the interface information was passed out to the port cards so that the ports could be configured to handle traffic according to the interface definition. This system had several drawbacks. For example, configuring all of the interfaces on a network element from a central card created a bottleneck, as a given network element may be required to support thousands or tens of thousands of interfaces. This limits scalability of the network element. Additionally, the central interface management system created a single point of failure which was required to be replicated to provide redundancy in the interface management system, thus increasing costs and complicating the management system by requiring the exchange of information between the redundant central interface control systems.

SUMMARY OF THE INVENTION

The present invention overcomes these and other drawbacks by providing a method and apparatus for managing interfaces on a network element. According to one embodiment of the invention, an interface manager provides a distributed interface creation mechanism to enable interfaces to be created in a distributed fashion to avoid congestion in the interface management system and to enable sparing of the interface management system to be accommodated. The interfaces created in the distributed manner communicate with applications and each other through an interface management process to enable a given interface to communicate with more than one application and to enable the network element to keep track of the interfaces that have been created on the network element.

According to an embodiment of the invention, the network element includes at least one control card configured to host applications, at least one data service card configured to create interfaces, and at least one input/output card (I/O card) to use the interfaces created by the data service card to handle data on the network. Communication between the control card and data service card is supported by an Interface Identification Manager (IFID manager) process.

Additionally, according to an embodiment of the invention, separation of interface creation from applications allows applications to use interfaces that have been created in a distributed fashion without modifying the application to accommodate the interface and without modifying the interface to accommodate the application. A given application can therefore access multiple media types through the creation of appropriate interfaces without requiring the application to be reprogrammed to accommodate the new media type. In one embodiment, this is accomplished through the use of an object-oriented interface management system in which interface entity objects may be created for interfaces, and units defining the properties of the interface may be created for the interface within the interface entities. Other properties of the units may be specified as well through the additional definition of families within the units.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 3 is a functional block diagram of an interface management system according to an embodiment of the invention;

FIG. 4 is a functional block diagram of a process that may be used to create an interface on the interface management system of FIG. 3 according to an embodiment of the invention;

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, according to an embodiment of the invention, an interface manager provides a media abstraction layer between applications and physical media to enable interfaces to be bound to applications without modifying the application to accommodate the interface and without modifying the interface to accommodate the application. The interface manager, according to one embodiment of the invention, provides a relationship database for mapping interface components to one another and binding applications to these components. The interface manager will also bind components to the various media agents to create and destroy interfaces. An interface can thus be mapped to many media layers without the media and application having intimate knowledge of the other.

Figure 1:
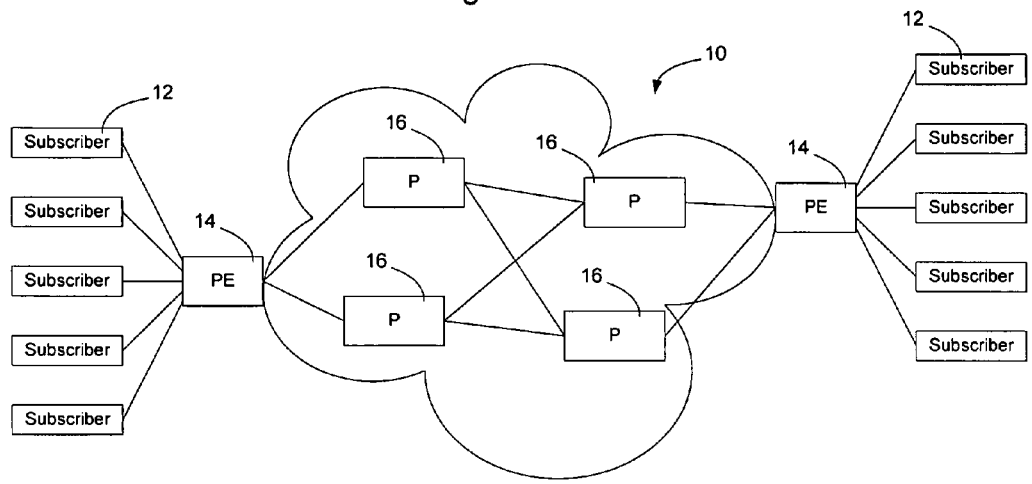
FIG. 1 is a functional block diagram of a network architecture
Figure 2:
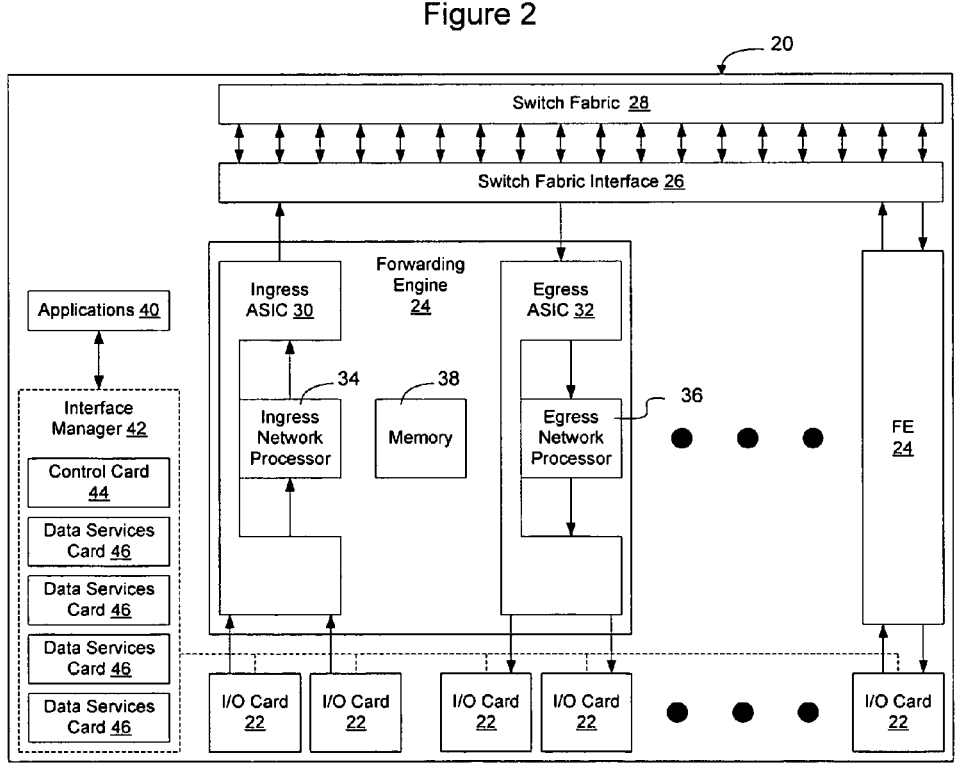
FIG. 2 is a functional block diagram of an example of a network element including an interface manager according to an embodiment of the invention.

FIG. 2 illustrates one embodiment of a network element 20 according to an embodiment of the invention. Although a description of the structure and methods of operation of the embodiment illustrated in FIG. 2 will be provided herein to enable operation of the invention to be understood, the invention is not limited to this particular network element or architecture, as the invention may be used more generally in any connection with any network element configured to handle protocol data units on a communications network. The network element of FIG. 2 may be used as a provider edge network element 14, a provider core network element 16, or as another type of network element, on a communication network such as the communication network described above in connection with FIG. 1.

As shown in FIG. 2, a network element 20 generally includes Input/Output (I/O) cards 22 configured to connect to links in the communications network. The I/O cards 22 may include physical interfaces, such as optical ports, electrical ports, wireless ports, infrared ports, or ports configured to communicate with other conventional physical media, as well as configurable logical elements capable of being programmed to implement interface definitions specified by an interface manager, as described in greater detail below.

One or more forwarding engines 24 are provided in the network element to process packets received over the I/O cards 22. The forwarding engines 24 forward protocol data units to a switch fabric interface 26, which passes the protocol data units to a switch fabric 28. The switch fabric 28 enables a packet entering on a port on one or more I/O cards 22 to be output at a different port in a conventional manner. A packet returning from the switch fabric 28 is received by one of the forwarding engines 24 and passed to one or more I/O cards 22. The packet may be handled by the same forwarding engine 24 on both the ingress and egress paths. Optionally, where more than one forwarding engine 24 is included in the network element 20, a given packet may be handled by different forwarding engines on the ingress and egress paths. The invention is not limited to any particular forwarding engine 24, switch fabric interface 26, or switch fabric 28, but rather may be implemented in any suitable network element configured to handle packets on data flows through a network. One or more Application Specific Integrated Circuits (ASICs) 30, 32 and processors 34, 36 may be provided to implement instructions and processes on the forwarding engines 24 in a conventional manner. Optionally, a memory 38 may be included to store data and instructions for use by the forwarding engines.

Applications 40 running on the network element, may require interfaces to be created across one or more ports on the I/O cards 22. Examples of applications include IP VPNs, VRF instances, Virtual Private Wire Service instances, Label Distribution Protocol instances, and numerous other types of applications. According to one embodiment of the invention, an interface manager 42 provides an environment for support of a media abstraction layer to enable the applications to have access to various interface types without the creation of dependencies between the applications and interfaces.

In the embodiment of the invention shown in FIG. 2, the interface management system includes one or more control cards 44 configured to host the applications and maintain interface information about the interfaces created on the network element. The interface management system also includes one or more data service cards that are configured to create interfaces, as directed by the applications, and program the interfaces on the I/O cards so that the interface definitions may be used to handle traffic by the network element. Communication between the applications and the data service cards is provided by an interface management process, that allows the control card to maintain information about interfaces that have been created on the network element. By causing the interfaces to be created on the data service card, rather than the control card, the creation of interfaces may be distributed in the network element to avoid bottlenecks in the interface management system. Additionally, by replicating interface information across data service cards, redundancy may be implemented to increase the resiliency of the interfaces.

Interfaces may have many different properties. For example, a given interface may include physical encapsulation, logical channels, services per logical channel, and attributes of these services. The interface manager enables interfaces to be described in this manner, thus enabling multiple interfaces to be created to support the applications. In operation, applications 40 requiring an interface on the network element 20 interact with an IFID manager process on the control card 44 of the interface manager system 42, which causes an interface to be created on one or more of the data service cards 46. The data service cards program the I/O cards 22 according to the interface definitions, so that the data received on a port associated with the interface will be handled according to the configuration of the interface and passed to the network processors in the network element. Optionally, the interface manager 42 may also pass configuration information to the forwarding engines 24 to enable them to handle the data received on the interface.

Interface management provides a way to create interfaces on a network element and allows the underlying properties of the interfaces to be abstracted from applications and from the data flow. An interface can be created, destroyed, enabled and disabled by the application. According to one embodiment, the interfaces and the aspects of interface management may be configured as a collection of objects, as discussed in greater detail below.

FIG. 3 illustrates a functional block diagram of an interface management system according to an embodiment of the invention. As shown in FIG. 3 and as discussed above with respect to FIG. 2, the interface management system 50 includes one or more control cards 44, one or more data service cards 46, and one or more I/O cards 22. When an application 40 requires an interface, it creates an application process 52 on one of the control cards 44. If the application process already exists, the application will use the existing process for to control the interface. The control card passes configuration information for the interface to one of the data service cards to enable the data service card to create the interface.

The interface is created in a host processor 54 on the data service card. A network processing unit 56 on the data service card then takes data plane information associated with the interface and uses that to program the interface into the I/O cards 22.

Communication between the control card and the data service card occurs via an interface management process referred to herein as an interface identity manager (IFID manager). The IFID manager does not create the entities, but rather is responsible for keeping track of the interfaces, and communicating state and status changes and other information between the interfaces and the applications.

FIG. 4 illustrates an example of a process that may be used to create an interface on the interface management system of FIG. 3 according to an embodiment of the invention. As shown in FIG. 4, when an application 40 requires an interface, it will create an application process 52 or will use an existing application process on the control service card 44. The application process will contact an IFID manager 58 and register with the IFID manager. The registration process includes passing information associated with the interface, such as the application type, the application ID, the application service group, the application stale timer count in seconds, the application address, and any other information that may be used to register the application. The invention is not limited to the particular information passed during the registration process. The IFID manager with which the application registers will become the host IFID manager for that application. When the application registers with the host IFID manager, the IFID manager distributes the application attributes to all of the other IFID managers.

To create an interface, configuration information is passed from an Operation, Administration and Maintenance (OAM) process 57 on the control service card to an interface entity on the data service card. The interface entity creates the interface according to the configuration (as discussed in greater detail below) and passes interface information through a multi-service base process 62 on the data service card to an IFID manager process 60 on the data service card. The IFID manager passes the configuration information to a the interface manager 58 on the control service card. Interface entities and their properties are discussed in greater detail below in connection with FIGS. 11 and 12. The interface entity will represent the interface on the network element. Since the data service cards are responsible for creation of interfaces, interface creation may be distributed in the network element.

An interface entity is a containment class for interfaces and their components. Interface entities include three types of information: control plane information, common information, and data plane information. The control plane information is data that contains information specific to the application. The common information is data that is something both the application and the data path needs, such as IP address information, IFID information, etc. The data plane application includes information that will be used to program the hardware abstraction layer, such as the processors and other circuitry on the I/O cards to allow the I/O cards to handle traffic according to the configuration of the interface. When an interface is created, the data plane information is used to plumb the data plane, and the control plane information and common information are distributed via the IFID manager 60 to other IFID managers on the network element for use by those IFID managers in connection with their interactions with other applications and interfaces on the network.

The type of information to be distributed to different components may vary, depending on the quantity of information and how the information will be used. For example, the host IFID manager 58 on the host control service card 44 and the IFID manager 58' on the control service card 44' associated with the standby application may be passed the control plane information and common information. For all other IFID managers, only the base node class (common information) is distributed. The invention is not limited to the type of information distributed between the IFID managers.

Using an IFID manager on the data service card to distribute information to the applications and other data service cards frees the interface from being required to maintain a database of those entities in the system that are required to be notified whenever a state or status change occurs on the interface. Specifically, by providing for notice to be channeled through the IFID manager, the interface entities may notify the other entities in the interface management system without maintaining an updated list of which entities, such as which applications, are currently using the interface. This simplifies management of the entities and enables the IFID manager to manage communications on behalf of the interface entities.

In the embodiment illustrated in FIG. 4, the control service card and data service card are illustrated as separate cards. The invention is not limited in this manner, however, as the data service card and control service card may be a single network card. In this event, a single IFID manager may be used to interface applications and interface entities.

Figure 5:
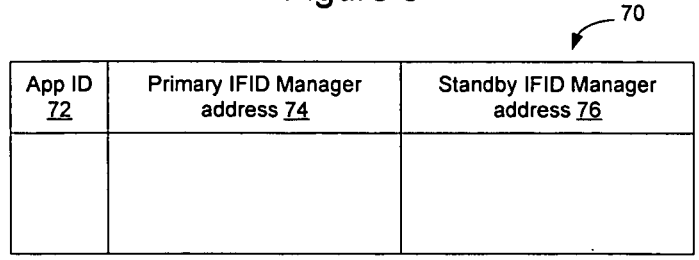
FIG. 5 is a functional block diagram of a data structure maintained by the portion of the interface management system associated with the data service card according to an embodiment of the invention.

The IFID manager 60 on the data service card 46 maintains a database 66 to enable it to keep track of which IFID managers are associated with which applications. One example of a data structure that may be maintained by the DSC-database 66 is illustrated in FIG. 5. As shown in FIG. 5, the IFID manager 60 on the data service card maintains a data structure 70 correlating application IDs 72 with primary IFID manager address 74 and a standby IFID manager address 76. Maintaining primary and standby IFID manager addresses allows the IFID manager on the data service card to direct communications to the IFID managers on the control service card whenever an interface associated with an application ID experiences a state or status change. Although one data structure has been illustrated, the invention is not limited to this particular illustrated data structure.

IFID managers on the control service cards are tasked with maintaining overall information associated with interfaces that have been created by the interface management system. Accordingly, each IFID manager 58 on a control service cards 44 maintains an IFID database 68. Data structures that may be maintained in the database 68 are illustrated in FIGS. 6-10. The invention is not limited to these particular data structures, as many types of data structures may be used as well. The particular data structures to be maintained may be configured to enable particular actions to be taken quickly upon occurrence of a state or status change at an entity, or upon a failure in a one of the cards associated with the interface management system.

Figure 6:
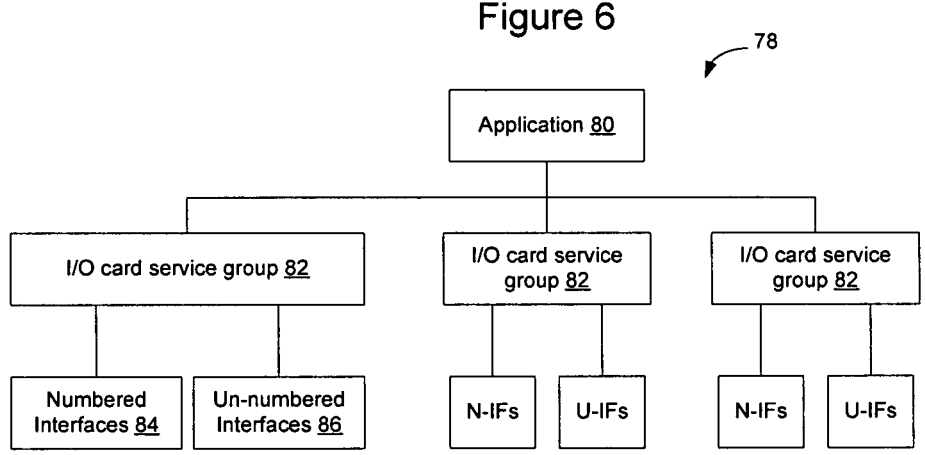
FIGS. 6-9 are functional block diagrams of data structures maintained by the portion of the interface management system associated with the control card according to an embodiment of the invention.

FIG. 6 illustrates one of the data structures 78 that may be maintained in the database 68. The data structure 78 illustrated in FIG. 6 will be referred to herein as an application tree. Since this data structure maintains information for a particular application, there will be one application tree per application type for a given IFID manager. As shown in FIG. 6, an application tree correlates an application 80 with I/O card service groups 82 that support interfaces for that application. The interfaces supported by an I/O card service group 82 are grouped into numbered interfaces 84 and un-numbered interfaces 86. Maintaining an application tree data structure allows the IFID manager to quickly identify I/O card service groups that are affected by a change in an application, so that the service groups may be notified of the change in state. Similarly, a change in state of an I/O card service group can quickly be correlated with applications that have interfaces configured through that service group.

Figure 7:
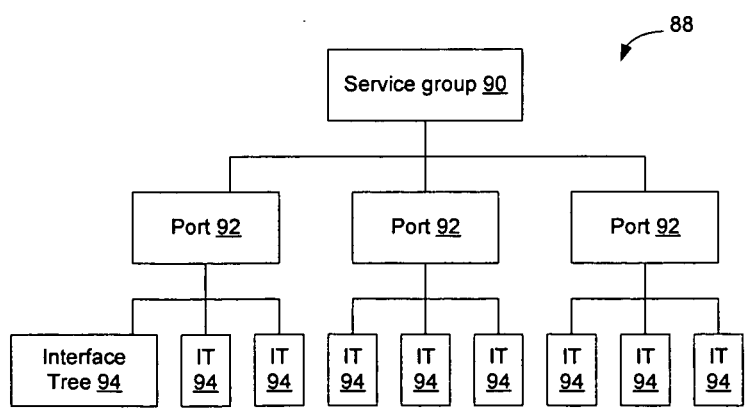

FIG. 7 illustrates another data structure that may be maintained by the IFID database 68. This data structure will be referred to herein as a service group tree data structure 88. In this data structure, service groups 90 are correlated with ports 92 and interface trees 94 associated with those ports. This allows the IFID manager to quickly identify which ports are associated with a given service group, and to identify which interfaces are associated with particular ports. Thus, upon failure of a service group, all ports and interfaces associated with the service group may be quickly identified so that those interfaces may be notified of the failure of the service group. Similarly, upon failure of a port, this data structure allows the interfaces associated with the port to be identified more quickly than if the IFID manager was required to perform a search through the configuration information of all interfaces to determine which interfaces are affected by a particular service group or port failure.

Figure 8:
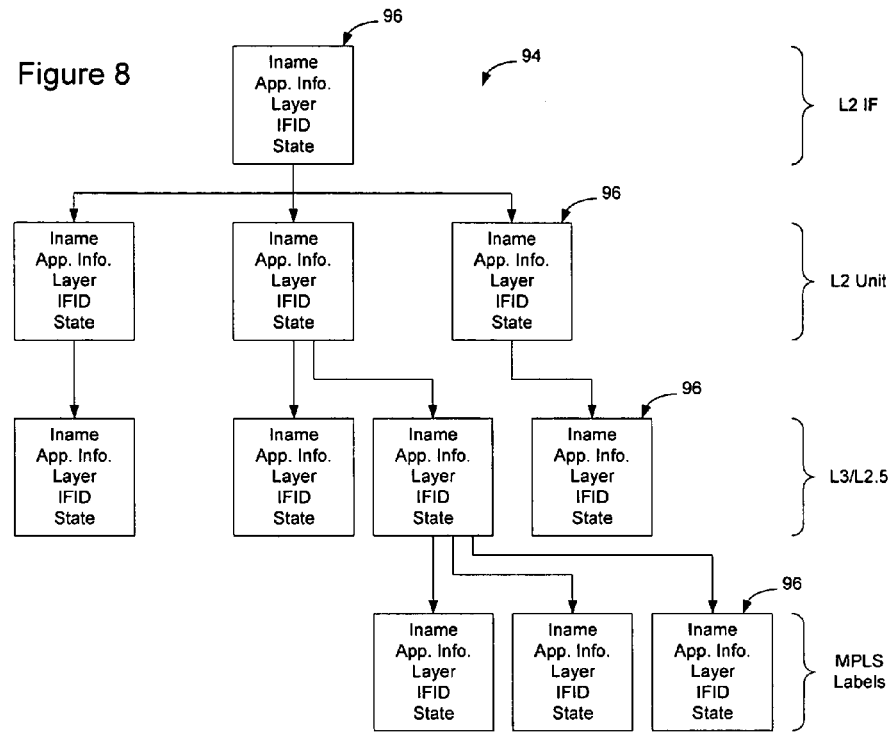

FIG. 8 illustrates an interface tree data structure 94. The interface tree data structure includes a plurality of nodes 96 arranged in an hierarchical manner, each of which contains information about a particular aspect of the interface. An example node structure is illustrated in greater detail in connection with FIG. 10, which will be discussed in greater detail below. In the data structure of FIG. 8, the interface tree includes a layer 2 interface node that is at the root of the tree, a node for each of the layer 2 units, a node for each of the layer 2.5/3 units associated with the layer 2 units, and if there are other attributes associated with the interface, such as MPLS labels or other sub-attributes, additional nodes may be included for these aspects of the interface as well.

Figure 9:
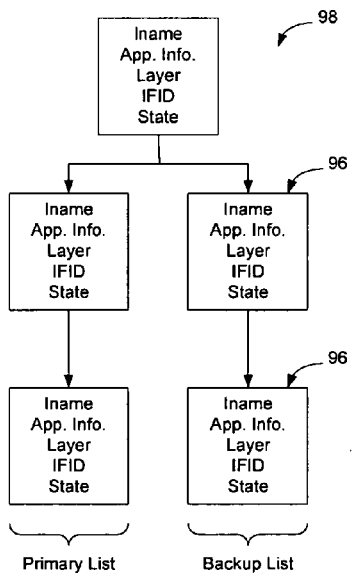

FIG. 9 illustrates an interface tree data structure for a virtual interface 98. The virtual interface data tree is similar to a standard interface tree, with the exception that the virtual interface at some stage must be correlated to a list of physical interfaces to be used to forward traffic. Accordingly, the nodes on the virtual interface tree data structure are organized according to primary and backup interface node entries.

Figure 10:
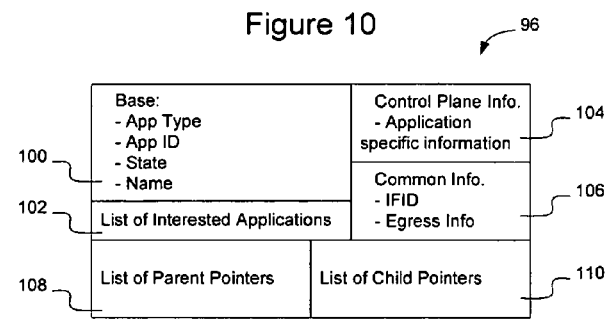
FIG. 10 is a functional block diagram of a data structure maintained at a node of the data structure of FIG. 8 or 9 according to an embodiment of the invention.

FIG. 10 illustrates a functional block diagram of a possible node structure 96. The invention is not limited to this node structure as many different node structures may be used. As shown in FIG. 10, each node 96 is formed from a base object 100 having base object information including the application type, application ID, state, and name. Other information may be included in the base object as well. This base information is common to all nodes within the interface tree and identifies the node as belonging to the tree.

In addition, the node will include a list of interested applications 102, which allows a change in state of the node to be quickly associated with interested applications to provide for quick notification of the state/status change to the interested applications. The node also includes control plane information 104 (application specific information) and common information 106 such as the IFID and egress information that was discussed in greater detail above. Finally, the node also includes information to enable it to describe its location in the tree hierarchy, such as a list of pointers to parent nodes 108 and a list of pointers to child nodes 110. Including the pointers allows the IFID manager to determine, from a particular node, what other nodes in the tree structure are related to that particular node.

Figure 11:
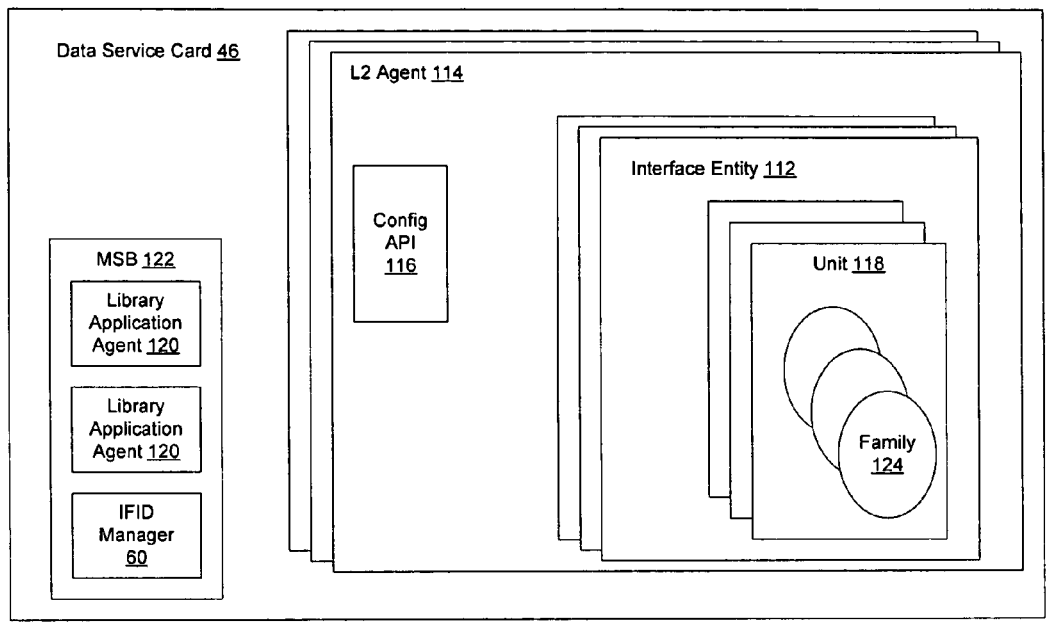
FIG. 11 is a functional block diagram illustrating interfaces created on a data service card according to an embodiment of the invention.
Figure 12:
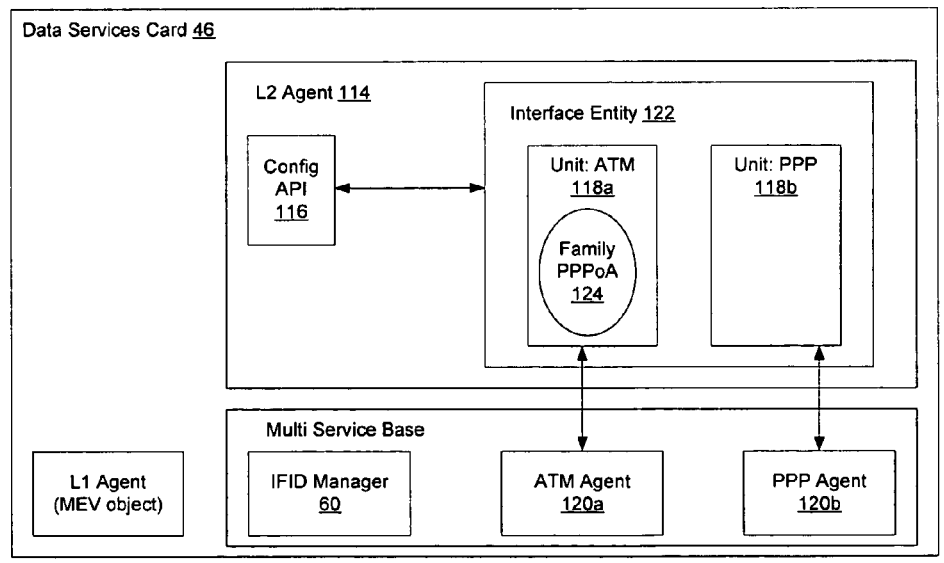
FIG. 12 is a functional block diagram of an example of an interface created on a data service card.

Creation of interface entities will now be discussed in greater detail in connection with FIGS. 11 and 12. As mentioned above, interfaces are created on a host processor 54 of a data service card. The data service cards create an interface by generating an interface entity for the interface. One example of a data service card on which several interface entities have been created is illustrated in FIG. 11. An example of a data service card configured with a particular example of an interface is illustrated in FIG. 12.

Interfaces are identified by their interface name (iName) and are represented as objects, referred to herein as interface entities 112, that are created when the interface is configured. With the exception of virtual interfaces, and other interfaces that are not bound to a particular media, interfaces are associated with a layer 2 media agent 114, which sets up the channel and framing for the interface.

As interfaces are configured, the interface entity 122 receives configuration information via a configuration API 116 associated with the Layer 2 agent 114 from the IFID manager on the control service card, and parses out the logical channels for the interface entity 112. These logical channels are represented as units 118 within the interface entity 112. Each unit has independent properties that define the unit, however they also share similar behaviors. For example, the units maintain state information, bind to applications, and are represented in the data-path. A unit object will be defined for each of the interface types that the network element supports. For example, unit objects may be defined for an Asynchronous Transfer Mode (ATM) interface type, a Frame Relay (FR) interface type, a Point to Point Protocol (PPP) interface type, and interface types designed to communicate using other protocols.

An interface entity 112 is therefore a collection of units 118 that have independent properties. A unit defines the logical partition for that port/channel. There can be many units defined within a given interface entity. Unit properties are defined by families 124 within the unit. A family defines the allowable application properties supported on the unit. A family may be thought of as a service that the unit can support and can have many associated attributes.

The L2 agent 114 is an object created within a messaging environment, and interface entities 112 are then created within that object. When an interface is to be created, OAM pushes the configuration for the interface to the L2 agent via the configuration API 116. The interface entity 112 is then created based on the configuration information and units are crated within the interface entity. Families are then defined, based on the configuration information, to specify the properties of the units.

Each unit is associated with a library application agent 120 that is created within a multi-service base environment 122 on the data service card. The multi-service base environment 122 also supports the IFID manager 60 described in greater detail above. Once the interface properties are defined, the units 118 within the interface are mapped to application agents that facilitate programming of the data-path.

Interfaces are created in several stages. First an interface is configured on a physical port on an input/output card. This configured component has an owner escape that will trigger the creation of a process (L2 media) on the data services card that hosts the input/output card. If the L2 media process already exists on the data services card, the existing L2 media process will be used and interface creation proceeds to the next stage.

The second stage is the creation of interface entity objects 112 representing the physical port/channel, within the context of the L2 agent messaging environment object 114. The messaging environment object 114 registers with OAM as an owner of the interface configuration and OAM pushes the configuration data to the messaging environment object 114. The data is then parsed by the interface entity 112 and used by the interface entity to start any agents, such as library application agents 120, that it requires based on the configuration information. The application agents 120 are started within the L2 process space per input/output card. Only one instance of these agents will exist in a single process. The interface entity will also start any units 118 and families 122 required to complete the configuration process.

The application agents 120 plumb the data-path and program the network processing unit (I/O cards) to complete establishment of the interface on the network element. The IFID manager 60 communicates information associated with the interface to the other IFID managers to allow the existence and properties of the newly created interface to be known throughout the interface management system.

All interface components, including units, families, and other components, are associated with a multi-service base interface identifier. This ID is used to identify the specific component of the interface. For example, the interface ID may have the following format:

| Application Number | Input/output card | Logical Channel Identifier | RSVD |
| --- | --- | --- | --- |
| 5 bits | 5 bits | 20 bits | 2 bits |

In this example, the application number is unique per application group. The Input/Output card group represents the I/O card and/or spared I/O card on a data services card. The logical channel identifier is a logical channel with the network processing unit that represents this object.

FIG. 12 illustrates an interface created on a data service card and configured to enable communication to take place using static PPP over ATM with IP addressing. The invention is not limited to creation of this particular interface, however, as this example is merely intended to illustrate application of the invention in a particular context.

Assume that a handshake has occurred between OAM and the port manager to create a port/channel for the interface on the data services card. The interface to be created is to be configured to be ATM with PPP encapsulation on one of the optical channels. Initially, an owner escape for the interface will create an L2 agent object 114 on that data services card for the interface (iName) configured to that port. The L2 object will create an interface entity 112 to represent that interface. The interface entity 112 will register with OAM as owner of the configuration using the OAM ID received at the time of creation. OAM will push the interface configuration down to the interface entity object via the configuration API 116. The interface entity will parse out the configuration information into units 118 and families 124. As units are created they are added to the interface entity. The IFID manager 60 will keep track of the interfaces and their multi-service base interface identifier and state and communicate with the IFID manager on the control services card. The interface entity 112 will bind with the appropriate agents 120 defined by the units and push the configuration for this new interface. The agents will respond to interface entity 112 with a multi-service base interface ID, egress information and state obtained from multi-service base. The interface entity 112 will then store the entire unit multi-service base interface identifiers in a tree based on the application type.

In this example, since the interface is to be configured to support PPP over ATM, a unit 118a for an ATM virtual circuit will be created, and a unit 118b for a PPP session will be created. Since PPP is an application running over ATM, there will also be a PPPoA family object created within the ATM Unit. The PPP unit will be part of the PPPoA family. The interface entity will bind to an ATM agent 120a on the data services card for this iName. The PPP unit will be treated as an application unit and will bind to the PPP agent on the data services card 120b.

The ATM agent will plumb the network processor via the multi-service base APIs. The multi-service base will return a multi-service base interface identifier and egress information to represent this media. These attributes are returned to the interface entity along with the state of the interface. The interface entity will store the common information, control plane information, and data path information for each unit, and will store the units in another tree referenced by the multi-service base interface identifier.

The similar process will occur for PPP, but only when the L2 agent is ready to host applications. The PPP agent in this case will also receive the L2 multi-service base interface identifier to bind to. The interface entity will then send the L3 multi-service base interface identifier of the family to the routing process (and any other interested application) that the interface is a part of.

All interfaces created with multi-service base interface identifiers on the data services card will be sent to via the IFID manager 60 to the IFID manager 58 on the control services card. As discussed in greater detail above, the IFID manager 58 will then be responsible for mapping multi-service base interface identifiers to the data services card and redistributing the egress info for that interface to all the data services cards that need to know about it.

Dynamic interfaces (units or family) work similar to the static interfaces, and are typically created by applications such as MPLS, PPP and L2TP. Any units/family created dynamically will be received as configuration requests via the configuration APIs on the interface entity. The multi-service base interface identifier of the dynamic units will be returned to the application requesting that unit. The process is similar to the one described above and hence will not be described in greater detail herein.

Virtual interfaces, e. g., GRE, L2TP, are interfaces created for applications that are not bound to any physical device. They typically exist on the control services card and can be used by many applications. Virtual interfaces are not media dependent and can sometime be bound to many different media interfaces. Virtual interfaces must be bound to one or more media interfaces in order to pass traffic.

Virtual interfaces may also be represented within an interface entity. A unit can be used to describe the properties of the virtual interface. In this instance, the interface entity will be contained within an applications process space, will not be bound to any physical port/channel, and will be owned by the applications. Virtual interfaces exhibit the same behaviors as other media interfaces; for example they maintain state and can be deleted.

Tunnels are also represented as units. A tunnel optionally can have an IP address, but it is not necessary. A tunnel configuration request will be presented to the interface entity by the application requiring the tunnel via the IFID manager. The application is responsible for selecting a data services card to represent the tunnel. If necessary, the interface entity will spawn a tunnel type agent 120 to plumb the tunnel on the data services card. The tunnels will assume a multi-service base interface identifier that will be returned to the application that requested it. Tunnel units will be bound to other units where required, if the tunnel is specifically using a unit.

For example, L2TP tunnels are not bound to any other units or to a particular interface. When an L2TP tunnel is configured, the L2TP process will send the configuration information to the L2TP agent on a data services card of its choosing. The L2TP agent will also be started when aggregation is configured on the network element. Each data services card will be running this process. The data services card will spawn an interface entity for the tunnel set and push down the configuration for the tunnel set. The interface entity will bind to the L2TP process that manages those tunnels. The interface entity will parse the configuration information and create a tunnel unit for each of the tunnels within the tunnel set. The tunnel units will contain an IPv4 family to describe the IP address for the tunnel. This is usually a host IP address. The tunnel will be assigned a logical channel identifier and a multi-service base interface identifier. When a tunnel is created the multi-service base interface identifier for that tunnel is sent to the tunnel manager via the IFID manager.

MPLS tunnels will be managed by the tunnel manager. The MPLS application will request the creation of a Reservation Protocol (RSVP) or Label Distribution Protocol (LDP) tunnel. LDP tunnels follow the same process explained above with respect to L2TP tunnels, however RSVP tunnels are bound to L2 units. For example, an ATM unit may be created and have a family for MPLS, this indicates that this unit will carry MPLS encapsulated packets.

Spared interface entities may be created in a manner similar to a primary interface entity. Both the active and the spared interface entity will maintain the same state for the interfaces. That means that the spared interfaces will be enabled and active if the data-path for interfaces on the active interface entity is enabled and active. This is required to provide a fast switchover and immediate data flow. Interfaces created on the spared interface entity will register with the spared interface manager (if one is there) and update the spared interface manager with state information. This is used as an audit as the interface manager will also journal learned interfaces.

In the situation where a data service card is not spared, a failure of the data service card will result in a loss of its interfaces. Applications and agents that were dependent on that interface entity will need to be notified. Although the data-path may still be active for the created interfaces, no new dynamic interfaces may be added.

When the interface entity recovers, it will reconstruct configured interfaces, using the setup process described above. When an agent is notified of the newly configured interface, it should respond as normal (with its multi-service base interface identifier) but ignore the multi-service base call. For applications that created dynamic interfaces, those applications will need to re-send the configuration for these dynamic interfaces and all multi-service base interface identifiers of which it is aware that relate to those dynamic interfaces. This is required since agents will probably not know how to correlate the multi-service base interface identifiers to these interfaces. Once the interfaces are reconstructed they are audited against what is known in the IFID manager regarding state and existence. If there is a difference between what the IFID manager knows and what the interface entity has received, the interface entity will be notified and may take corrective action.

If the IFID manager is not spared, it will need to save both the free virtual multi-service base interface identifier pool and the used virtual multi-service base interface identifier pool. This will need to be saved in memory and reloaded when the IFID manager recovers. Any applications that requested virtual multi-service base interface identifiers will need to be notified of the IFID manager failure, including the interface entities on the network element.

When the IFID manager recovers, the interface entities will send interface state information to the IFID manager. Applications that are using virtual multi-service base interface identifiers will also send the virtual multi-service base interface identifier maps to the interface manager. The IFID manager will not need to redistribute any multi-service base interface identifiers to data services cards, however, as they already are up to date. Optionally, the interface agents on the data services cards may send an audit message containing information about interfaces of which they are aware to check for differences in this information.

The functions described above may be implemented as a set of program instructions that are stored in a computer readable memory within the network element and executed on one or more processors within the network element. However, it will be apparent to a skilled artisan that all logic described herein can be embodied using discrete components, integrated circuitry, programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. An interface management system for creating, managing and destroying interfaces on a network element, the interfaces enabling physical resources of the network element to be abstracted for use by applications running on the network element, the interface management system comprising:
    an application process object associated with an application running on the network element;
    an interface entity object configured to provide interface services to the application process object, the interface entity object representing one of a physical port and a channel to be used by the application within the network element; and
    an interface identification (IFID) manager configured to interface between the application process object and the interface entity object to manage communications between the objects, the IFID manager providing an environment for support of a media abstraction layer to enable applications to access a plurality of interface types without creation of dependencies between the applications and interfaces of the plurality of interface types.

2. The interface management system of claim 1, wherein the IFID manager comprises a host interface manager associated with the application process object, and an interface manager object associated with the interface entity object.

3. The interface management system of claim 2, wherein the interface manager object is associated with other interface entity objects as well as the interface entity object.

4. The interface management system of claim 1, wherein the interface entity is a collection of units, each of which defines a logical partition for a particular port or channel.

5. The interface management system of claim 4, wherein properties of the units are defined by families with the unit, such that a family defines allowable application properties supported on the unit.

6. An interface management system for managing interfaces between applications on a network element and ports on the network element, the interface management system comprising:
    an input/output (IO) card;
    a data service card configured to create an interface based on configuration information from a control service card, and to program the IO card based on data plane information associated with the interface;
    a control service card configured to pass the configuration information concerning an interface to the data service card to enable the data service card to create the interface; and
    an interface identity (IFID) manager configured to manage communication between the control service card and the data service card, the IFID manager providing an environment for support of a media abstraction layer to enable applications to access a plurality of interface types without creation of dependencies between the applications and interfaces of the plurality of interface types.

7. The interface management system of claim 6, wherein the IFID manager is further configured to monitor the interface, the monitoring including communicating state and status changes between the interface and an application.

8. The interface management system of claim 6, wherein the IFID manager registers an application seeking to communicate through an IO card.

9. The interface management system of claim 8, wherein registration includes gathering information from the application, the gathered information including at least one of an application service group, an application stale timer, and an application address.

10. The interface management system of claim 8, wherein the IFID manager that registers the application becomes the host IFID manager for the registered application and distributes application attributes to other IFID managers.

11. The interface management system of claim 6, wherein the IFID manager is resident on the control service card.

12. The interface management system of claim 11, wherein the interface entity includes:
    control plane information that includes information specific to an application; and
    data plane information used to program a hardware abstraction layer on the IO card.

13. The interface management system of claim 6, wherein the data service card includes an interface entity acting as a containment class for interfaces and interface components.

14. A method for managing interfaces between applications on a network element and ports on the network element, the method comprising:
    receiving configuration information from a control entity associated with an application;
    creating an interface based on the configuration information;
    programming an input/output (IO) device based on data plane information associated with the created interface;
    managing communication between the application and the IO device via the interface; and
    providing, via an interface identification (IFID) manager, an environment for support of a media abstraction layer to enable the application to access a plurality of interface types without creation of dependencies between the application and interfaces of the plurality of interface types.

15. The method of claim 14, further comprising monitoring the created interface, the monitoring including communicating state and status changes between the created interface and the application.

16. The method of claim 14, further comprising registering the application by gathering information concerning the application, the gathered information including an application service group.

17. The method of claim 14, further comprising distributing application attributes to other IFID managers.

18. The method of claim 14, further comprising providing an interface entity including control plane information that includes information specific to the application.

19. The method of claim 18, wherein the interface entity further includes data plane information used to program a hardware abstraction layer on the IO device.

* * * * *